United States Patent [19]
Oono et al.

[11] Patent Number: 5,909,320
[45] Date of Patent: Jun. 1, 1999

[54] DRIVE APPARATUS FOR ZOOM LENS BARREL

[75] Inventors: Masahiro Oono, Saitamaken; Hisao Iwande, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 08/989,137

[22] Filed: Dec. 11, 1997

[30] Foreign Application Priority Data

Dec. 16, 1996 [JP] Japan .................................. 8-335731

[51] Int. Cl.⁶ .................................................. G02B 15/14
[52] U.S. Cl. ........................................... 359/696; 359/699
[58] Field of Search ..................................... 359/694, 696, 359/697, 699, 701, 704, 823, 700

[56] References Cited

U.S. PATENT DOCUMENTS

| | | | |
|---|---|---|---|
| 4,914,461 | 4/1990 | Hori | 396/62 |
| 5,113,261 | 5/1992 | Morisawa | 358/225 |
| 5,140,468 | 8/1992 | Kayanuma | 359/699 |
| 5,196,963 | 3/1993 | Sato et al. | 359/699 |
| 5,266,992 | 11/1993 | Takaoka et al. | 354/199 |
| 5,485,236 | 1/1996 | Arai et al. | 354/195.11 |

*Primary Examiner*—Georgia Epps
*Assistant Examiner*—Rickey Mack
*Attorney, Agent, or Firm*—Greenblum & Bernstein P.L.C.

[57] ABSTRACT

A drive apparatus for a zoom lens barrel having at least two movable lens groups, one of which is used also as a focusing lens group comprising: a pair of lens frames which respectively hold the two movable lens groups, a pair of driven pins which are integrally provided on the lens a drive cam plate which is provided with a pair of cam surfaces which engage with the corresponding driven pins and which is rotatable about an axis, a rack plate which is supported to move in the optical axis direction of the movable lens groups and which is provided with an engaging portion which engages with the driven pin of the movable lens group that is used also as a focusing lens group, a first drive mechanism which includes a first motor for swinging the drive cam plate in the forward and reverse directions, and a second drive mechanism which includes a second motor for moving the rack plate without having an influence on the angular position of the drive cam plate.

5 Claims, 14 Drawing Sheets

DRIVE APPARATUS FOR ZOOM LENS BARREL

BACKGROUND OF THE INVENTION

1. Field of the Invention

The present invention relates to a drive apparatus for a zoom lens barrel.

2. Description of the Related Art

A zoom lens includes at least two movable zoom lens groups which are moved in predetermined directions upon zooming. In many zoom lenses, one of the two movable lens groups functions as a focusing lens group. In a conventional or classical drive mechanism which has been used particularly for a single lens reflex camera in which no focal shift during zooming is accepted, the movable lens groups are moved along tracks defined by cam grooves formed on a cam ring so as not to cause the focal shift. The position of the focusing lens group, one of the two movable lens groups, is controlled in accordance with the object distance.

In another type of known drive mechanism for compact cameras or digital cameras in which it is necessary to correctly focus on an object at the time of shutter releasing, the movable zoom lens groups are moved upon zooming while permitting the focal shift, and thereafter the movable lens groups are moved to an in-focus position in accordance with set focal length data and set object distance data upon the shutter releasing.

SUMMARY OF THE INVENTION

It is an object of the present invention to provide a new zoom lens drive apparatus in place of a classic drive apparatus using a cam ring, wherein, on one hand, the two movable lens groups are moved while keeping a predetermined relationship during the zooming operation and, on the other hand, one of the two movable lens groups, i.e., the focusing lens group is moved during the focusing operation and wherein the positions of the two movable lens groups can be independently controlled.

Another object of the present invention is to provide a drive apparatus for a zoom lens barrel having at least two movable lens groups, wherein the barrel body having the movable lens groups and the drive mechanism thereof are prepared as sub-assembly units, thus resulting in an easy assembling operation.

To achieve the object mentioned above, according to the present invention, there is provided a drive apparatus for a zoom lens barrel having at least two movable lens groups, one of which is used also as a focusing lens group, comprising a pair of lens frames which respectively hold the two movable lens groups, a pair of driven pins which are integrally provided on the lens frames, a drive cam plate which is provided with a pair of cam surfaces which engage with the corresponding driven pins and which is rotatable about an axis, a rack plate which is supported to move in the optical axis direction of the movable lens groups and which is provided with an engaging portion which engages with the driven pin of the movable lens group that is used also as a focusing lens group, a first drive mechanism which includes a first motor for swinging the drive cam plate in the forward and reverse directions, and a second drive mechanism which includes a second motor for moving the rack plate without having an influence on the angular position of the drive cam plate.

In order to make the drive apparatus small, it is preferable that the driven pins extend in parallel from the lens frames in the same direction and that the rack plate and said drive cam plate partly overlap in a plan view.

Preferably, the rack plate, the drive cam plate, the first drive mechanism including the first motor, the second drive mechanism including the second motor are provided in a lens drive unit separate from a lens barrel body which holds therein the movable lens groups. The lens drive unit can be secured to the lens barrel body so that the driven pins projecting from the lens barrel body engage with the cam surfaces of the drive cam plate and the engaging portion of the rack plate. Thus, the drive mechanisms form a sub-assembly unit.

According to another aspect of the invention there is also provided a drive apparatus for a zoom lens barrel having at least two movable lens groups, one of which is used also as a focusing lens group, comprising: a drive cam plate which is provided with a pair of cam surfaces which controls the positions of the two movable lens group, said drive cam plate being rotatable about an axis; a rack plate which is supported to move in the optical axis direction to move the movable lens group, that is used as the focusing lens group, together with the rack plate; a first drive mechanism which includes a first motor for swinging the drive cam plate in the forward and reverse directions; and a second drive mechanism which includes a second motor for moving the rack plate without affecting the angular position of the drive cam plate.

The present disclosure relates to subject matter contained in Japanese Patent Application No. 8-335731 (filed on Dec. 16, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

A zoom lens barrel according to an embodiment of the present invention is applied to a digital camera using a CCD.

Figure 6:
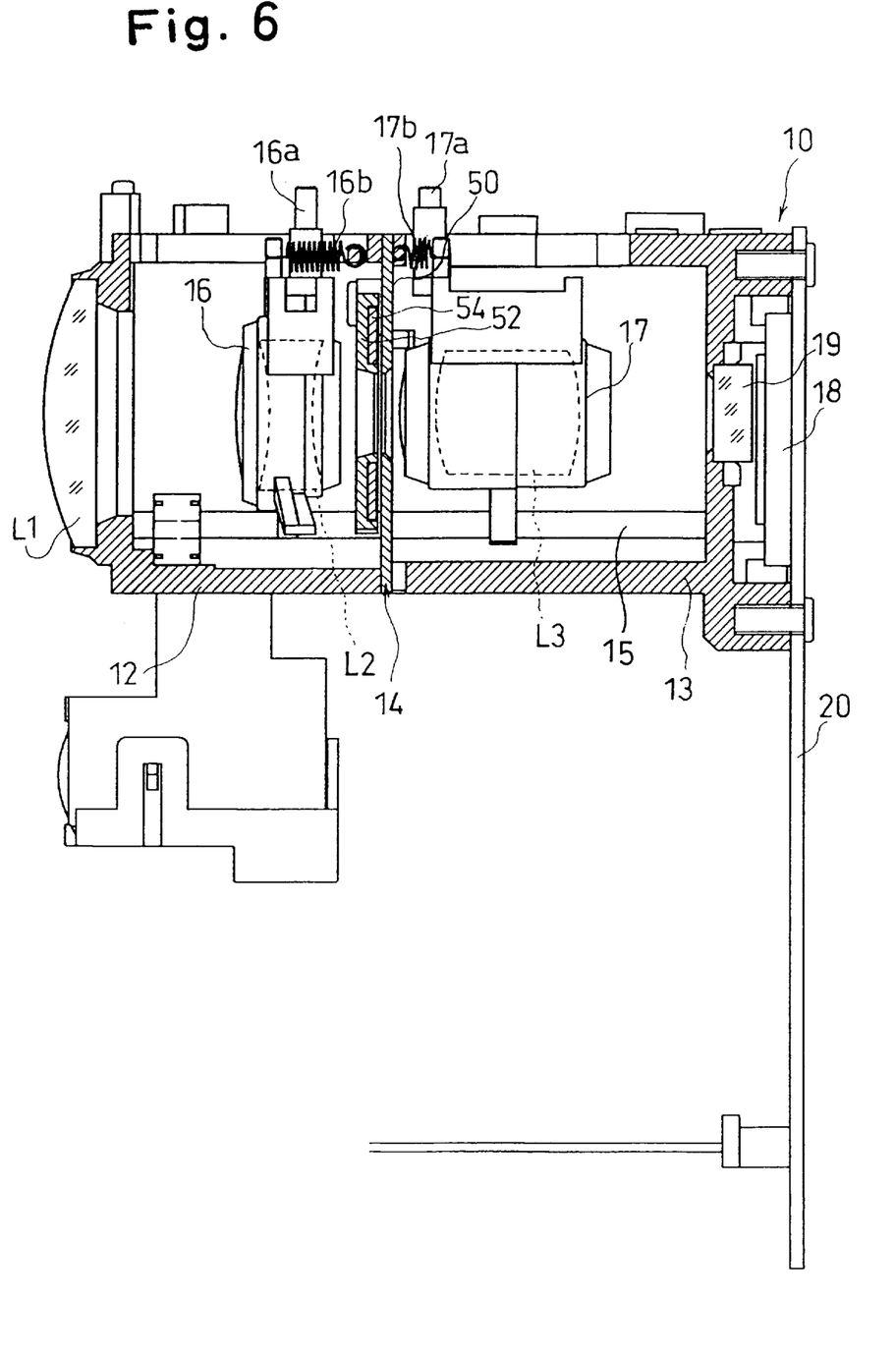
FIG. 6 is a longitudinal sectional view of FIG. 5, at a telephoto extremity.
Figure 7:
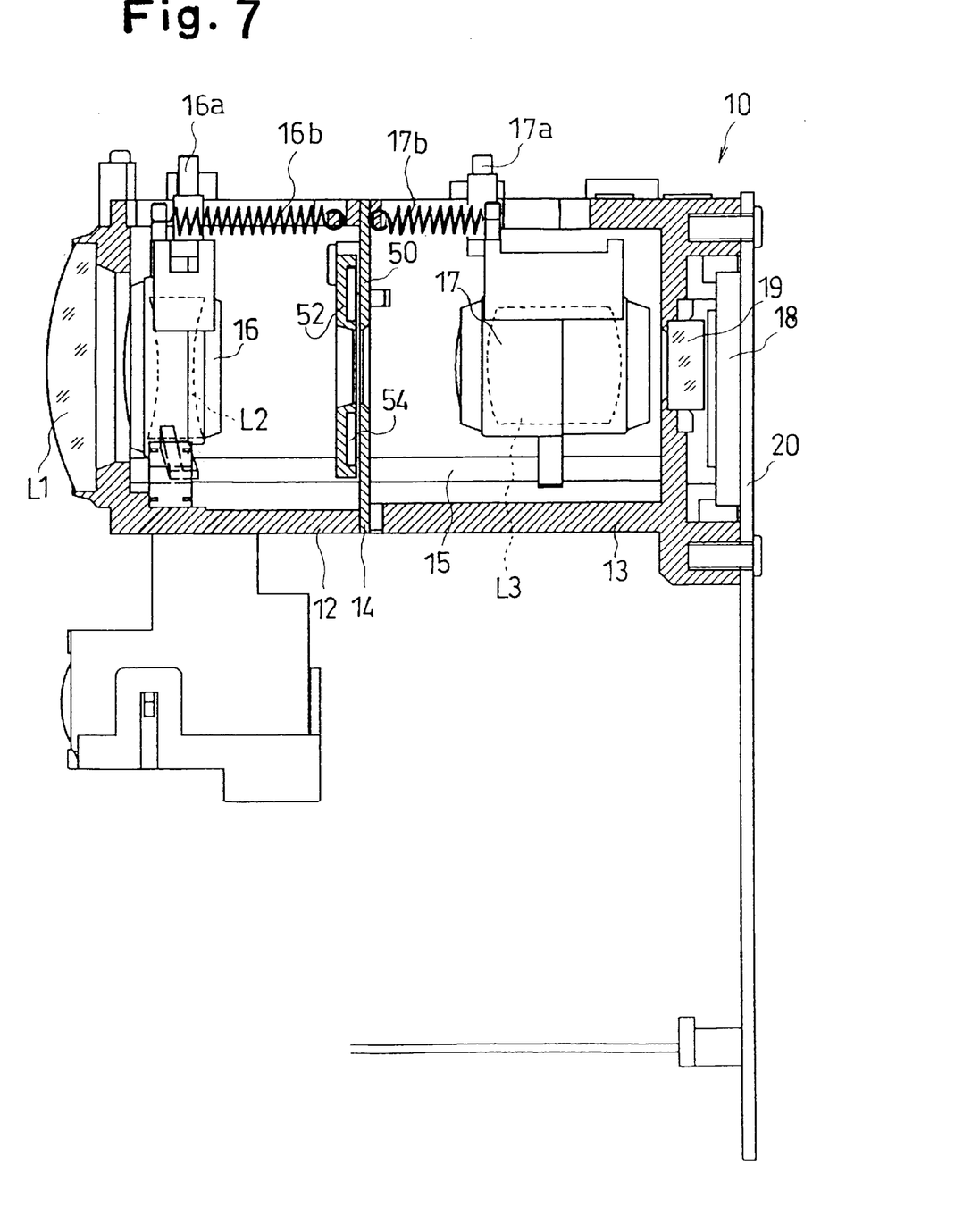
FIG. 7 is a longitudinal sectional view of FIG. 5, at a wide angle extremity.
Figure 8:
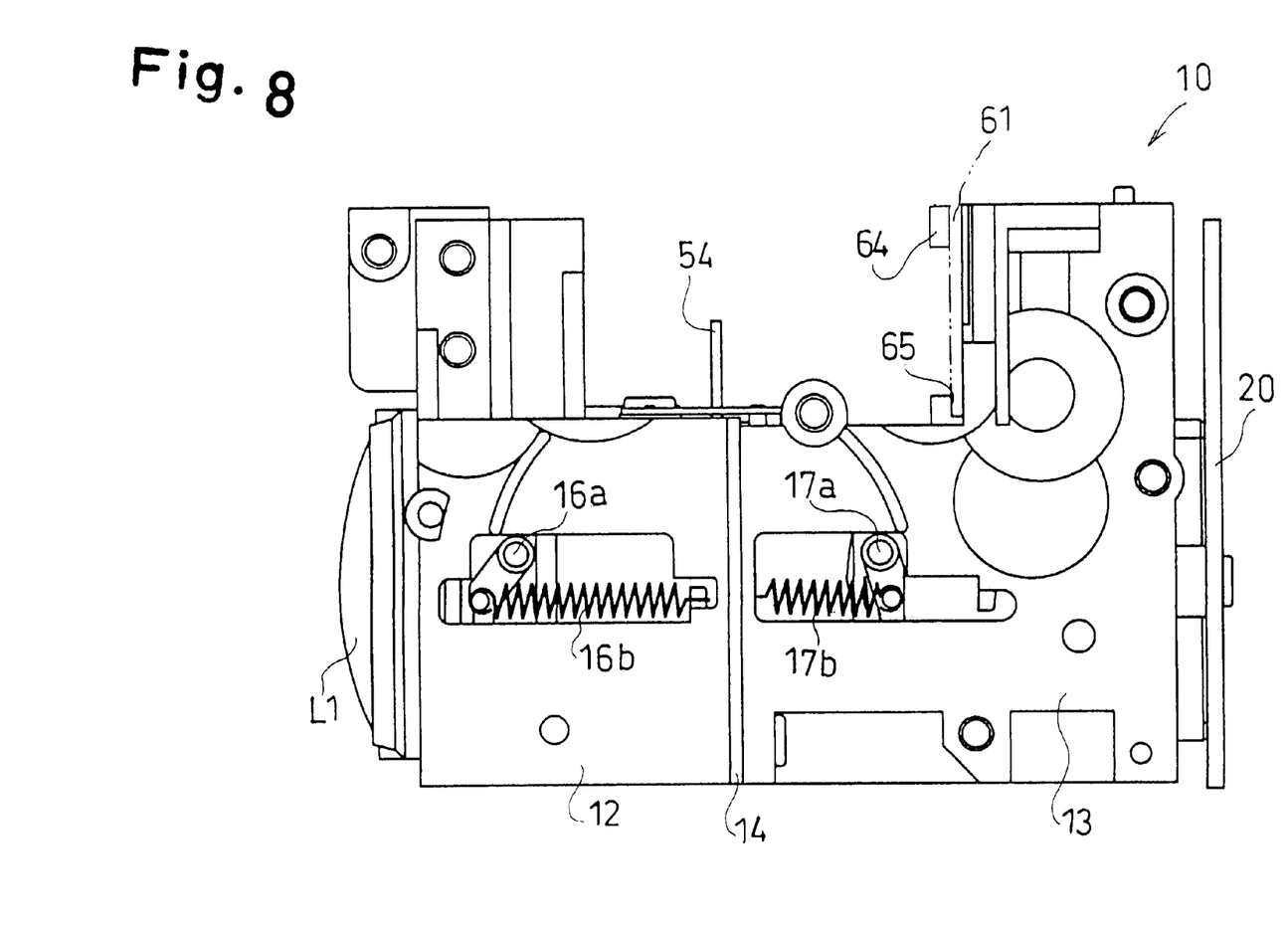
FIG. 8 is an end view viewed from the direction indicated by an arrow VIII in FIG. 5.

The zoom lens system is comprised of three lens groups consisting of a first stationary lens group L1 of positive power, a second movable lens group L2 of negative power, and a third lens group L3 of positive power, as shown in FIGS. 6 and 7. The zoom lens system constitutes a variable focal zoom lens in which the magnification change (zooming) operation is carried out by moving the second and third lens groups L2 and L3, and the adjustment of the focal shift which causes during the zooming operation and the focusing operation are carried out by moving the second lens group L2.

Figure 9:
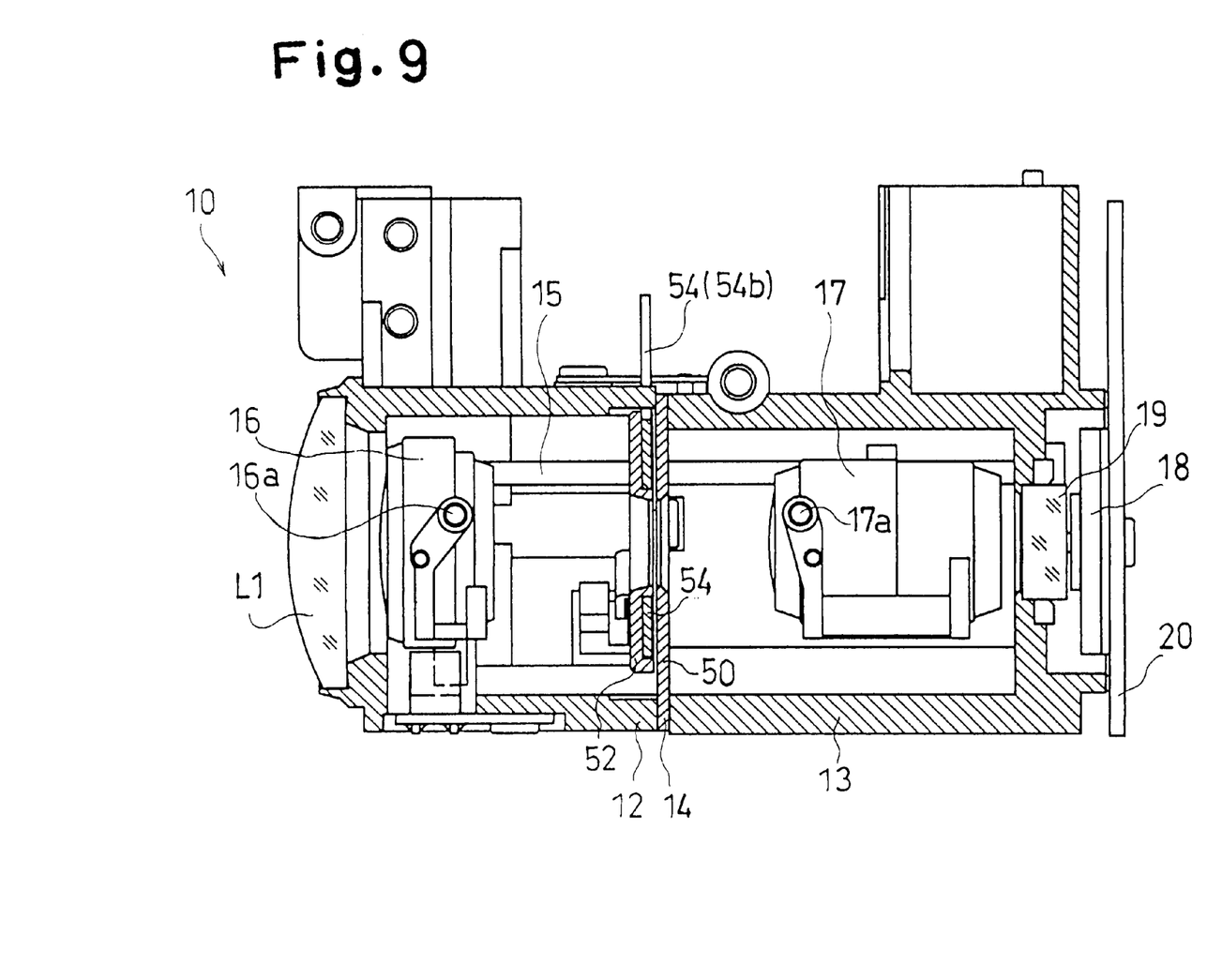
FIG. 9 is a cross sectional view of FIG. 8.

As shown in FIGS. 5 through 9, the lens barrel body 10 is essentially composed of a front plastic body 12, a rear plastic body 13, and a diaphragm block 14 held between the front and rear plastic bodies 12 and 13. A plurality of guide rods 15 (only one rod is shown in FIGS. 6, 7, 9) are provided extending between the front and rear bodies 12 and 13 in parallel with the optical axis. A second lens frame 16 which holds the second lens group L2 and a third lens frame 17 which holds the third lens group L3 are movable, guided by the guide rods 15. The CCD (image pickup device) 18 is provided behind the third lens frame 17 and is provided with a substrate 20 which is secured to the rear body 13. A crystal filter 19 is provided between the third lens frame 17 and the CCD 18.

The second lens frame 16 and the third lens frame 17 are respectively provided with second and third parallel lens pins (driven pins) 16a and 17a that extend upward, respectively. The second lens frame 16 is biased rearwardly (toward the CCD 18) by a backlash removing tensile spring 16b and the third lens frame 17 is biased forwardly by a tensile spring 17b.

As may be supposed from the telephoto position shown in FIG. 6 and the wide-angle position shown in FIG. 7, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved always in opposite directions.

Figure 13:
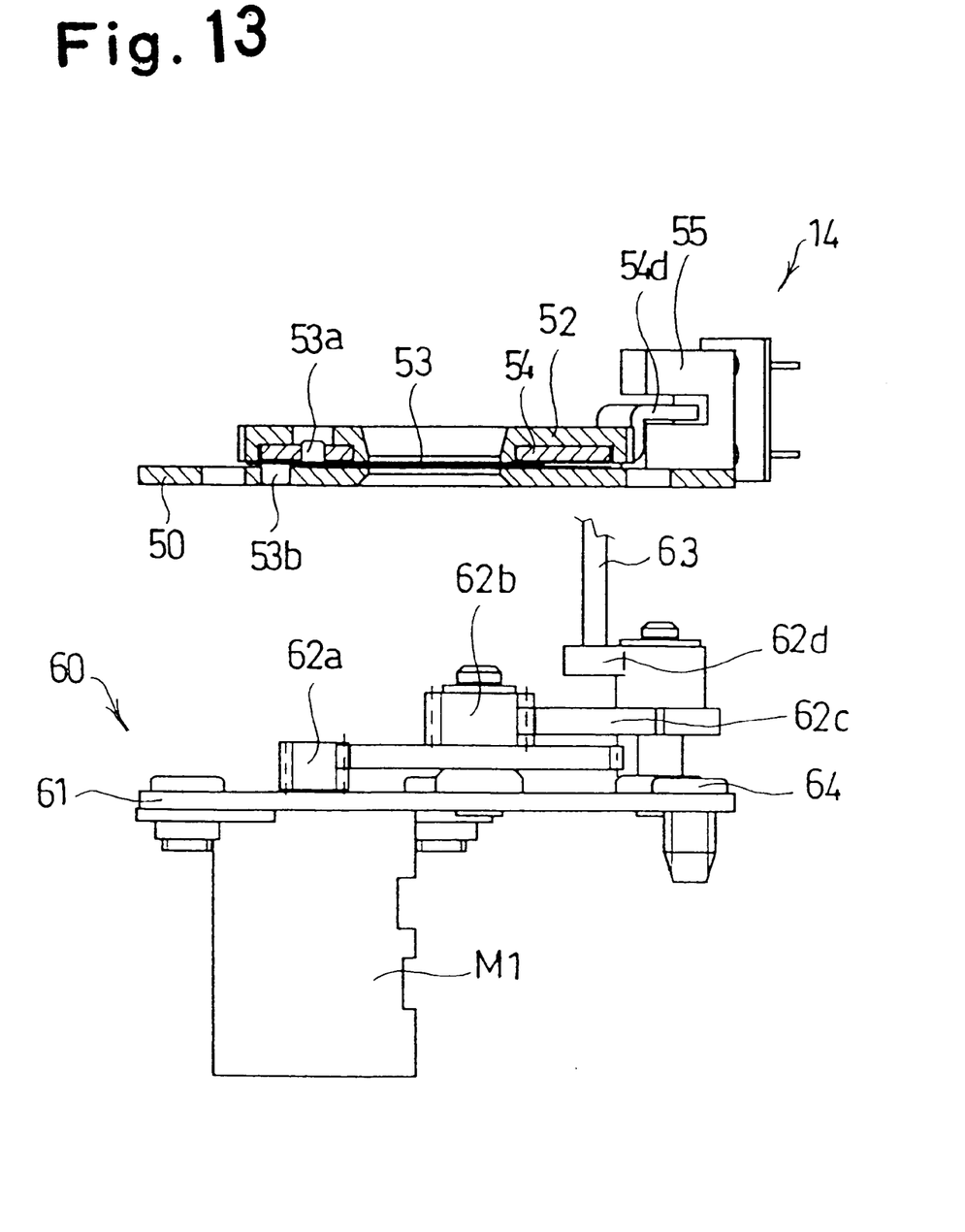
FIG. 13 is a sectional view taken along the line XIII—XIII in FIG. 10.

The front body 12 is provided with a photodetector (origin sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog plate 23 interrupts the light from the photodetector 22 to detect the origin of the lens groups L2 and L3. The displacement of the lens groups from the origin is detected by a zooming pulse motor M3 and a lens controller 70 (FIG. 13).

The drive mechanism which drives the second lens frame 16 and the third lens frame 17 in the lens barrel body 10 is assembled as a lens drive unit 30 which is attached to bridge the front body 12 and the rear body 13. The lens drive unit 30 will be discussed below with reference to FIGS. 1 through 4.

Figure 1:
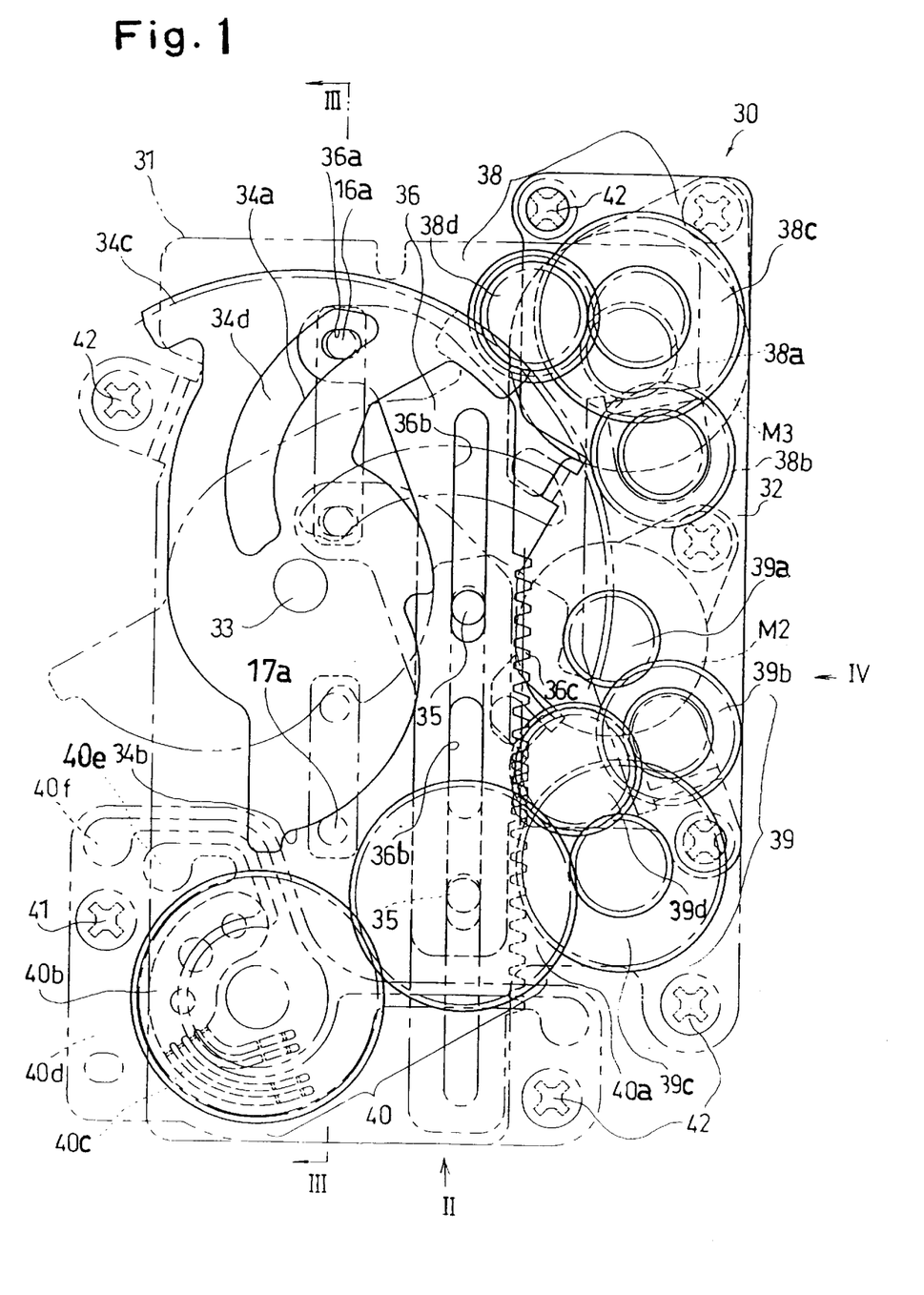
FIG. 1 is a plan view of an embodiment of a lens drive unit for a zoom lens barrel according to the present invention.

The lens drive unit 30 is provided with first and second mother plates 31 and 32 which lie stepwise in different planes at different heights. In FIG. 1, for clarity, the upper first mother plate 31 is indicated by a dotted line and the lower second mother plate 32 is indicated by a solid line, respectively. The focusing motor (second lens motor) M2 and the zooming pulse motor (third lens motor) M3 are secured to the lower surface of the lower mother plate 32 so that the drive shafts of the respective motors extend in a direction perpendicular to the lower mother plate. A drive cam plate 34 is pivoted to the first mother plate 31 through the shaft 33. A rack plate 36 is movably supported by the mother plate 31 through a pair of support pins 35 to linearly move in the direction parallel with the optical axis. The drive cam plate 34 and the rack plate 36 partly overlap in a plan view.

The drive cam plate 34 is provided with a pair of cam surfaces (cam grooves) 34a and 34b which engage with the second and third lens pins 16a and 17a, respectively. The cam surface 34a is defined by one side of the through hole 34d. The diameter of the second lens pin 16a is considerably smaller than the width of the through hole 34d.

The second and third lens pins 16a and 17a are biased by the respective tensile springs 16b and 17b, as mentioned above, so that the lens pins are pressed against the cam surfaces 34a and 34b to keep the continuous contact therebetween.

Figure 2:
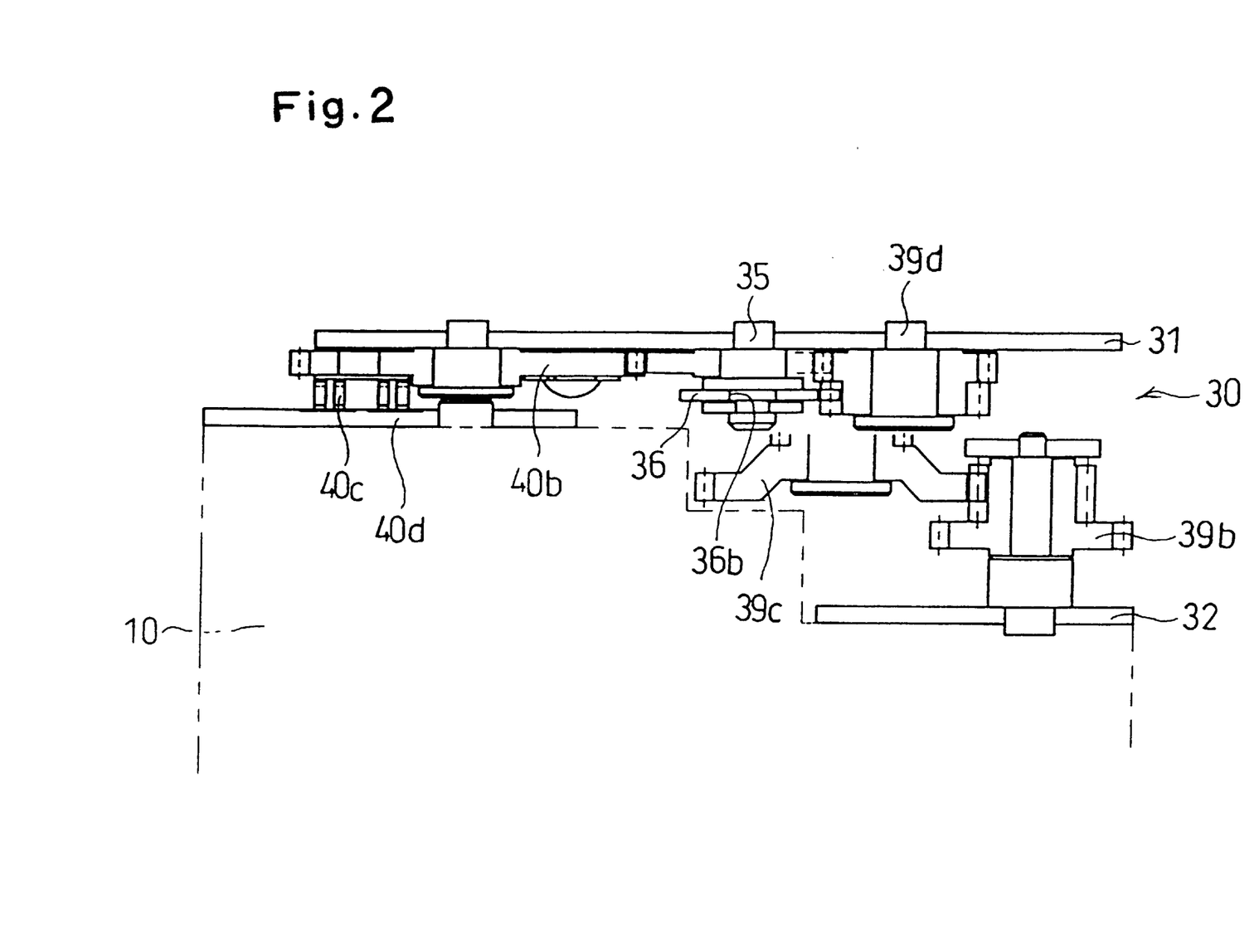
FIG. 2 is an end view viewed from the direction indicated by an arrow II in FIG. 1.
Figure 3:
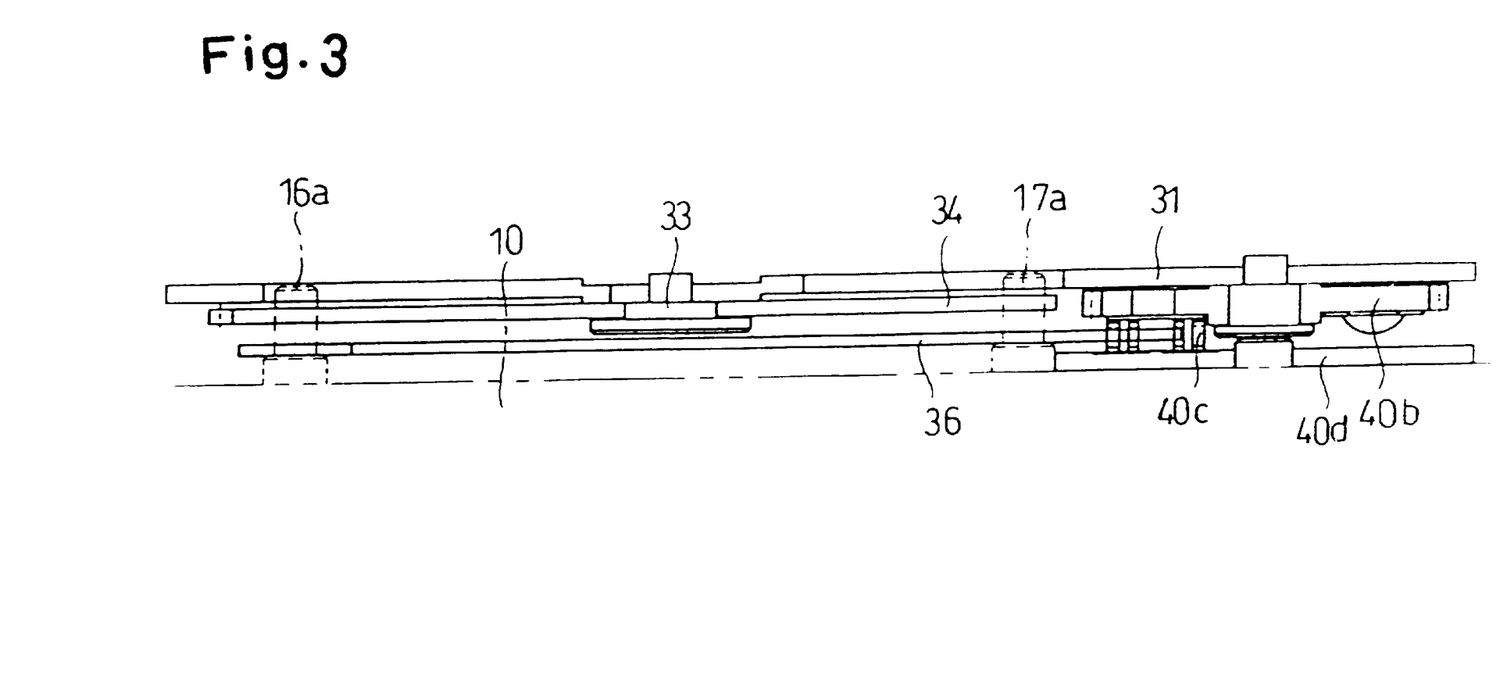
FIG. 3 is a sectional view taken along the line III—III in FIG. 1.
Figure 4:
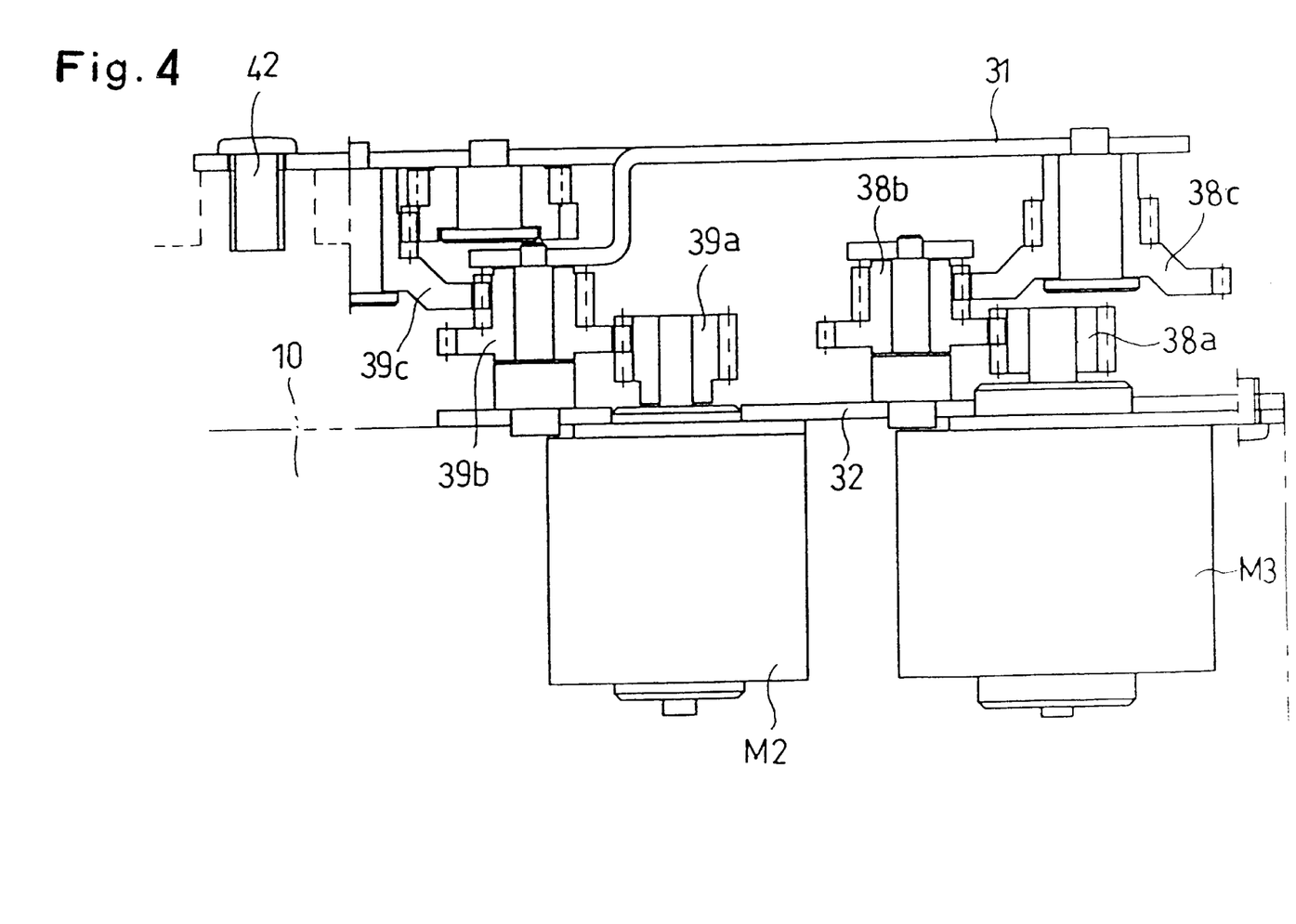
FIG. 4 is an end view viewed from the direction indicated by an arrow IV in FIG. 1.
Figure 5:
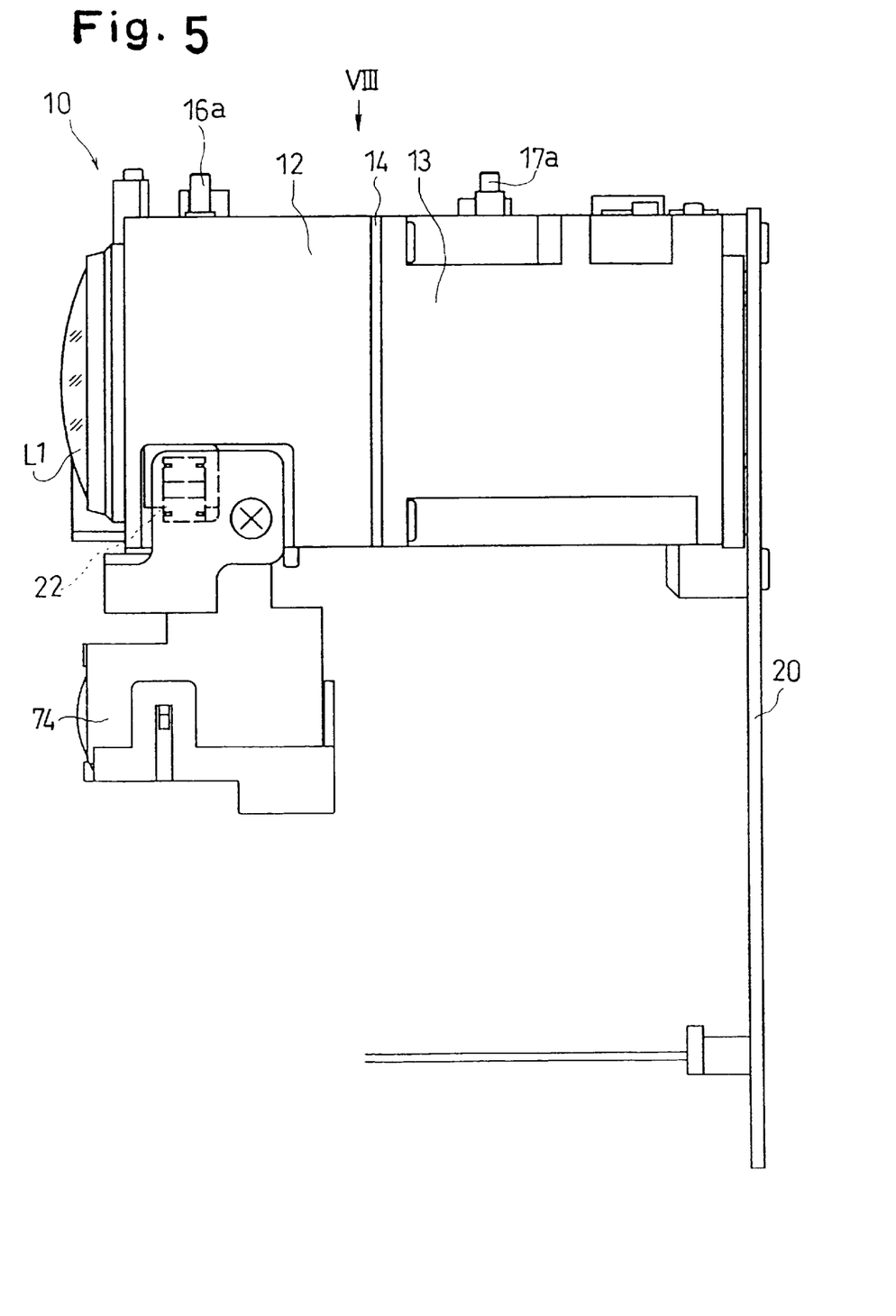
FIG. 5 is a left side view of a lens barrel body before a lens drive unit is incorporated therein.

The second lens pin 16a of the second lens frame 16 engages with the cam surface 34a and extends through an engaging hole 36a formed in the rack plate (plate with rack) 36. The second lens pin 16a is snugly fitted in the engaging hole 36a in the direction parallel with the optical axis by tensile spring 16b. The rack plate 36 is provided with a pair of guide slots 36b which extend in the direction parallel with the optical axis, so that the support pins 35 can be fitted in the guide slots 36b. The rack plate 36 is suspended by the support pins 35, as seen in FIG. 2.

A gear mechanism 38 which transmits the rotation of the zooming pulse motor M3 to the drive cam plate 34, a gear mechanism 39 which transmits the rotation of the focusing motor M2 to the rack plate 36, and a volume mechanism (variable resistor) 40 are provided between the first and second mother plates 31 and 32. A first gear 38a secured to the output shaft of the zooming pulse motor M3 is functionally connected to a sector gear 34c formed on the outer peripheral surface of the drive cam plate 34 through a second gear 38b, a third gear 38c, and a fourth gear 38d. Each of the gears from the second gear 38b through to the fourth gear 38d are double gears having a pair of coaxial spur gears.

A first gear 39a secured to the output shaft of the focusing motor M2 is functionally connected to the rack 36c formed on the rack plate 36 through a second gear 39b, a third gear 39c, and a fourth gear 39d. The second gear 39b and the third gear 39c are double gears having a pair of coaxial spur gears. The third gear 39c is in mesh with a fourth gear 39d and with a rotatable brush gear 40b of the volume mechanism 40 through an intermediate gear 40a. The brush gear 40b is provided on the rear surface thereof with a brush 40c secured thereto. A resistor plate 40d is secured to the rear body 13 independently of the lens drive unit 30 (before the lens drive unit 30 is attached), so that the resistor plate 40d comes into contact with the brush 40c. The resistance between two terminals 40e and 40f of the resistor plate 40d varies in accordance with the angular position of the brush gear 40b, and hence, the resistance corresponding to the angular position of the rack plate 36, i.e., the absolute position of the second lens frame 17 (second lens group L2) can be detected.

The shape of the cam surfaces 34a and 34b of the drive cam plate 34 are determined such that the second lens frame 16 (second lens pin 16a, second lens group L2) and the third lens frame 17 (third lens pin 17a, third lens group L3) are moved along predetermined zoom tracks. When the drive cam plate 34 is swung through the zooming pulse motor M3 and the gear mechanism 38, the zooming operation by the second and third lens groups L2 and L3 are carried out. The focal length data is detected through the photosensor 22, the dog plate 23, and the lens controller 70. Note that the rotation of the drive cam plate 34 causes the second lens pin 16a to move through the cam surface 34a, and hence the rack plate 36 is moved in the optical axis direction through the engaging hole 36a.

When the focusing motor M2 is driven in accordance with the object distance data, the rack plate 36 is driven through the gear mechanism 39. In the illustrated embodiment, the position in which the second lens pin 16a abuts against the cam surface 34a corresponds to the infinite object distance, and hence the rack plate 36 is moved forward upper direction in FIG. 1 as the object distance is reduced. The movement of the rack plate 36 takes place within the through hole 34d of the drive cam plate 34 which defines the cam surface 34a. Therefore, the movement of the rack plate 36 does not affect the swing position (angular position) of the drive cam plate 36. Therefore, the volume mechanism 40 always detects the infinite object distance position of the second lens group L2 in the present focal length in accordance with the position of the rack plate 36. Focusing can be carried out by driving the motor M2 from this state to move the second lens group L2 by a determined amount corresponding to the object distance. The moving amount of the rack plate 36 during the focusing operation is detected by the volume mechanism 40 for the second lens group.

The lens drive unit 30 (except for the resistor plate 40d) as constructed above is formed as a unit separate from the lens barrel body 10 or the diaphragm block 14. The resistor plate 40d is secured to the rear body 13 by means of a plurality of screws 41 and is thereafter secured to the lens barrel body 10 (front body 12 and rear body 13) by means of a plurality of screws 42.

Figure 10:
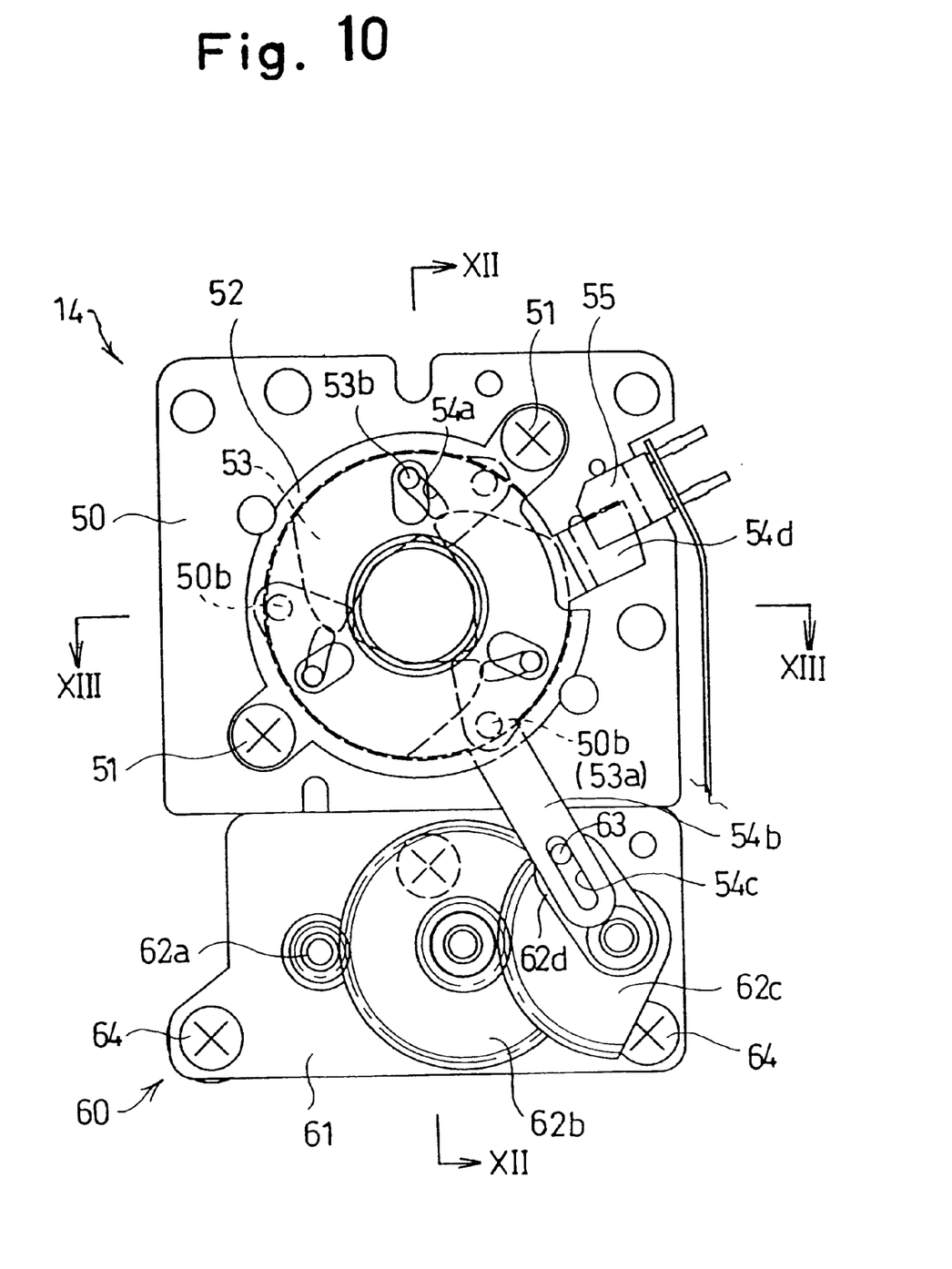
FIG. 10 is a front elevational view of a diaphragm drive unit in a full open aperture position.
Figure 11:
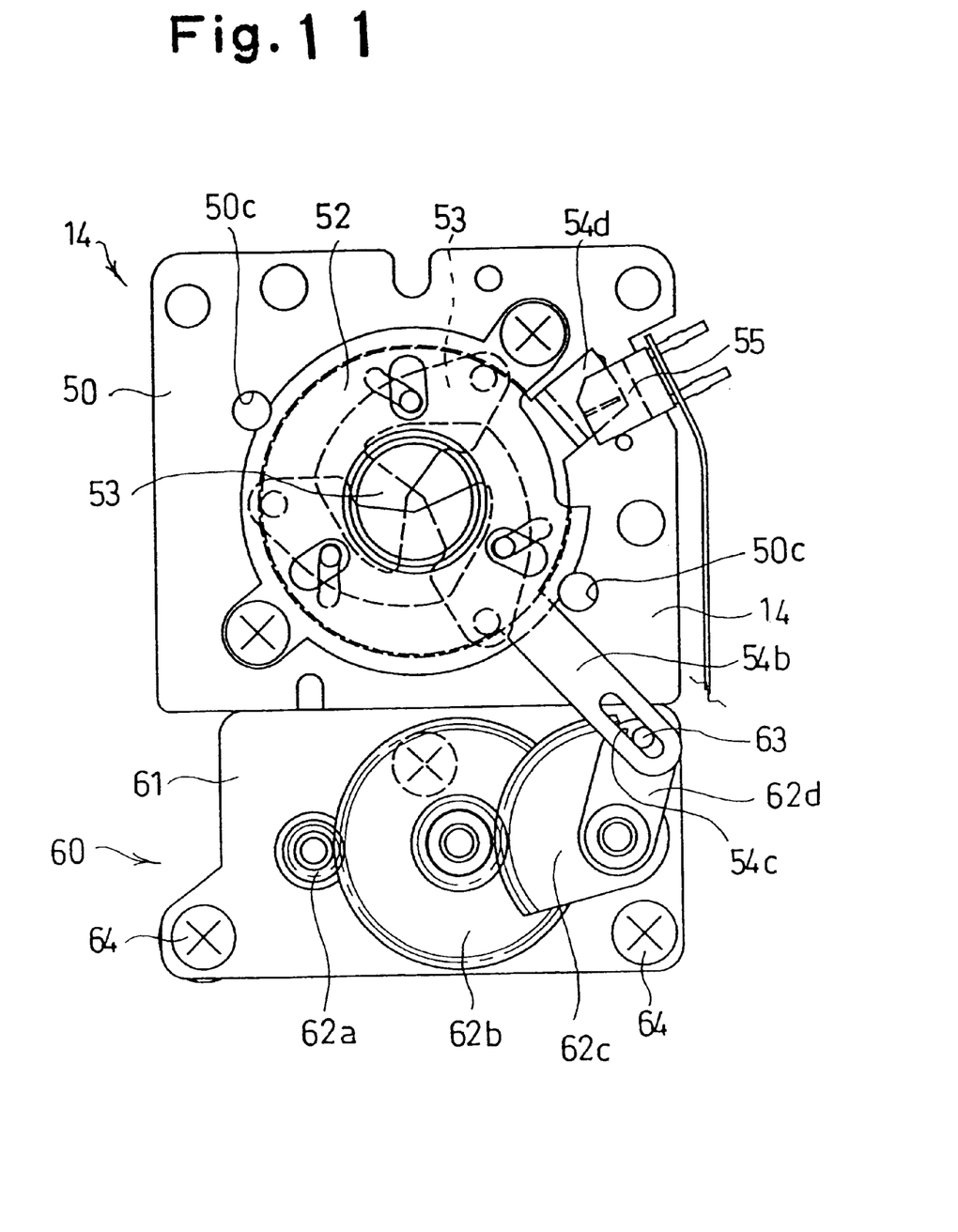
FIG. 11 is a front elevational view of diaphragm drive unit in a minimum aperture position.
Figure 12:
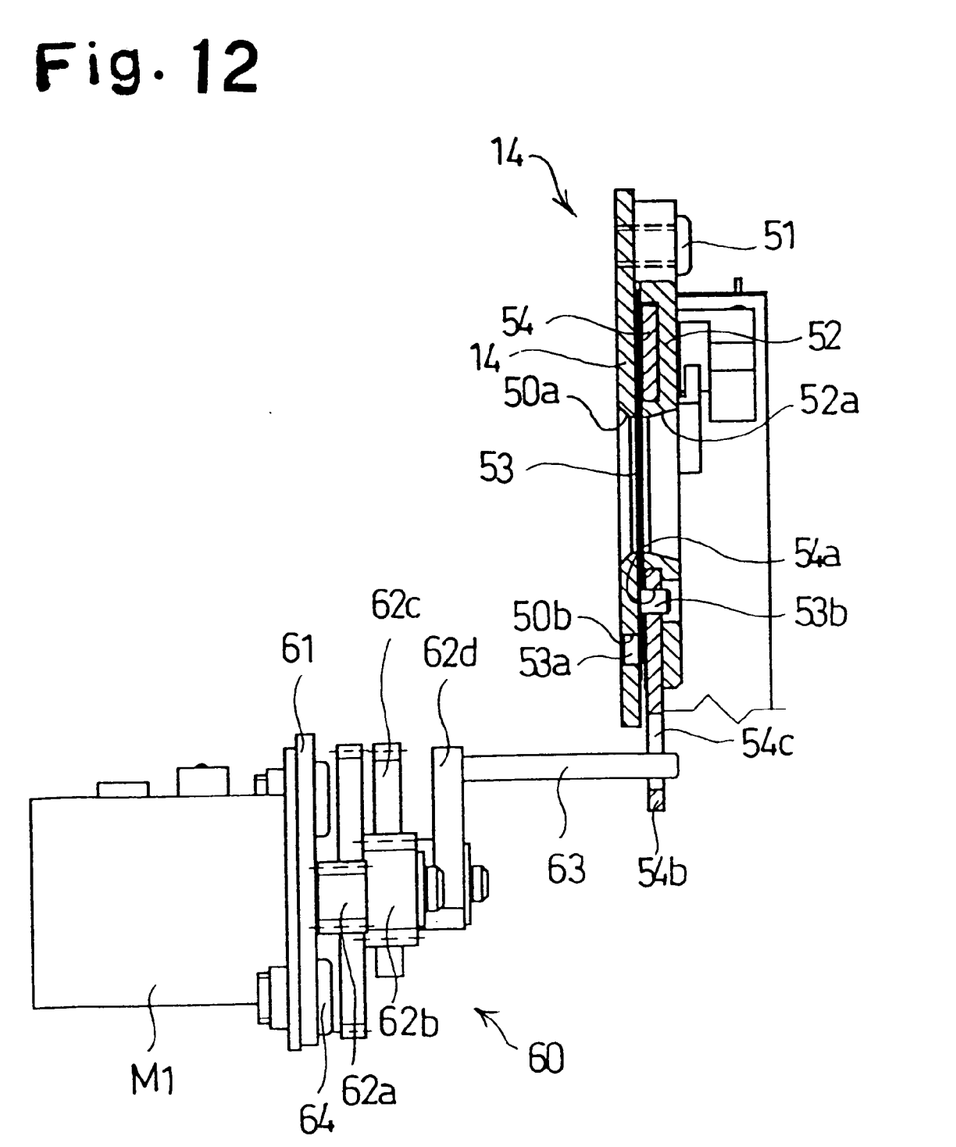
FIG. 12 is a sectional view taken along the line XII—XII in FIG. 10.

The diaphragm block 14 held between the front body 12 and the rear body 13 and the drive unit 60 of the diaphragm block 14 will be explained below with reference to FIGS. 10 through 12. A substrate 50 of the diaphragm block 14 and the retainer 52 which is secured to the diaphragm block 14 by screws 51 are provided with apertures 50a and 52a around the optical axis, respectively. The substrate 50 is provided with holes 50b formed around the aperture 50a, so that one of a pair of dowels 53a of diaphragm blades 53 are inserted in the holes 50b. An opening and closing ring 54 is rotatably provided between the substrate 50 and the retainer 52. The opening and closing ring 54 is provided with cam holes 54a in which the other dowels 53b of the diaphragm blades 53 are fitted. In the above-mentioned diaphragm mechanism which is per se known, when the opening and closing ring 54 is rotated, the size of the aperture defined by the blades 53 is varied between the full-open position (maximum aperture) shown in FIG. 10 and the smallest aperture (minimum aperture) shown in FIG. 11.

The opening and closing ring 54 is provided with a radially extending arm 54b which is in turn provided with a radially extending association groove 54c. The photodetector (origin sensor) 55 which detects the origin of the diaphragm mechanism is secured to the diaphragm block 14. The substrate 50 is provided with a dog 54d projecting therefrom, corresponding to the photodetector 55. In the illustrated embodiment, the full-open position of the diaphragm (aperture) corresponds to the origin, so that the dog 54d interrupts light from the photodetector 55 to detect the origin. The set diaphragm value (angular displacement of the opening and closing ring 54) when the aperture size is reduced from the full-open position by the opening and closing ring 54 is detected by the diaphragm pulse motor M1 and the lens controller 70.

The drive unit 60 as a separate unit is secured to the rear body 13 at a position different from the substrate 50 of the diaphragm block 14 in the optical axis direction and radial direction. The diaphragm pulse motor M1 is secured to the substrate 61 of the diaphragm drive unit 60. A first gear 62a secured to the output shaft of the diaphragm pulse motor M1 is connected to the sector gear 62c through a second gear 62b. The sector gear 62c is provided with a radial arm 62d integral therewith, which is in turn provided with an association pin 63 which is fitted in the radial association groove 54c of the opening and closing ring 54. The second gear 62b is a double gear having a pair of coaxial spur gears.

The diaphragm block 14 and the diaphragm drive unit 60 are each pre-assembled as a unit. The substrate 50 of the diaphragm block 14 is held and secured between the front and rear bodies 12 and 13. The substrate 61 of the drive unit 60 is secured to the rear body 13 by means of a plurality of screws 64, in a state that the association pin 63 is fitted in the radial association groove 54c of the opening and closing ring 54 and one end of the substrate 61 is held in a holding groove 65 (FIG. 8) of the rear body 13.

Figure 14:
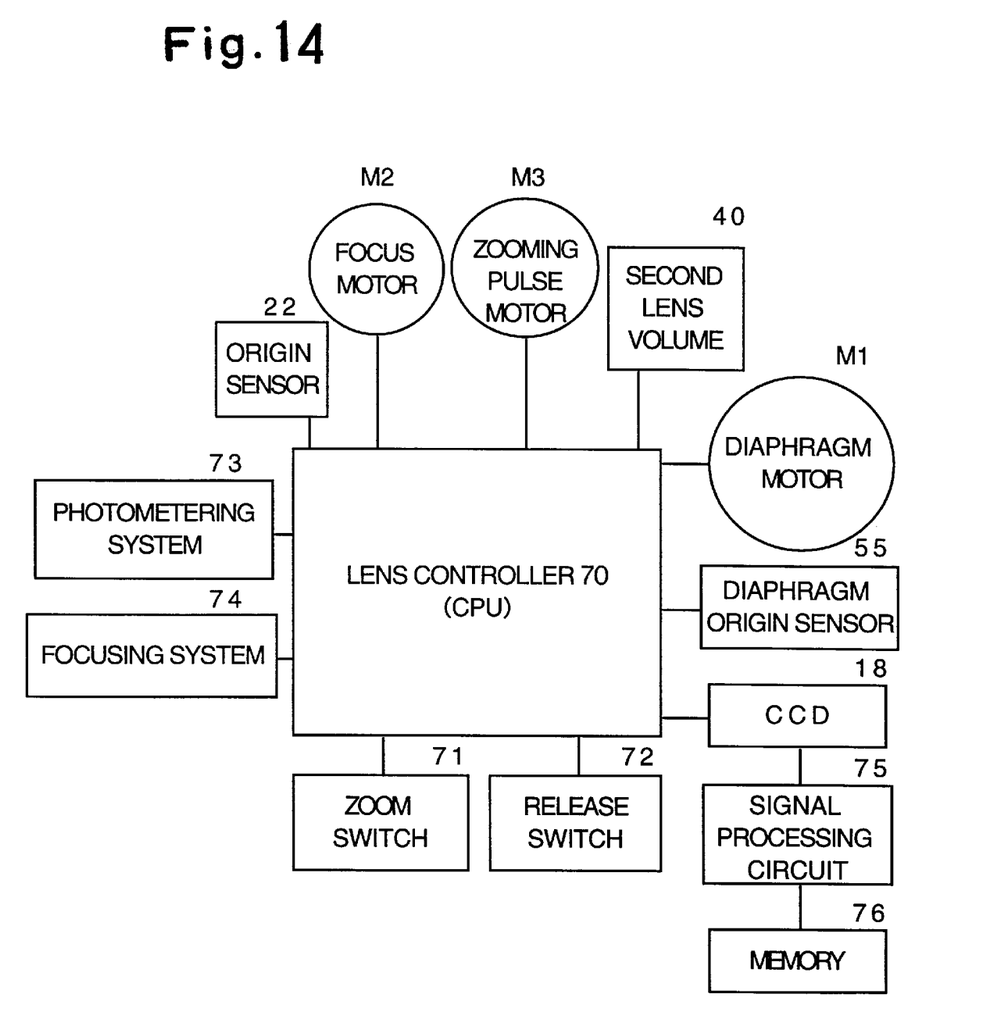
FIG. 14 is a block diagram of a control system in a zoom lens barrel according to the present invention.

FIG. 14 shows a control system of the zoom lens barrel. Connected to the lens controller (CPU) 70 is the diaphragm pulse motor M1, the focusing motor M2, the zooming pulse motor M3, the second lens origin sensor 22, the second lens volume mechanism 40, the diaphragm origin sensor 55, the CCD 18, a zoom switch 71, a release switch 72, a photometering system 73, an object distance detecting device 74 and an EEPROM. In general, the CCD 18 can constitute the photometering system 73. The object distance detecting device 74 can be either of a passive type or an active type. In the embodiment illustrated in FIGS. 1 through 3, the object distance detecting device 74 is a passive type. Image data formed on the CCD 18 is converted to an electric signal which is stored in the memory 76 through the signal processing circuit 75.

The basic operation of the zoom lens barrel constructed as above operates as follows.

At the wide-angle extremity shown in FIG. 7, if the zoom switch 71 is operated toward the wide-angle position, the drive cam plate 34 is rotated through the zooming pulse motor M2 and the gear mechanism 38. Consequently, the second lens frame 16 (second lens group L2) and the third lens frame (third lens group L3) are moved along predetermined tracks through the cam surfaces 34a and 34b. The position of the second lens frame 16 is detected by the volume mechanism 40, the second lens origin sensor 22 and the lens controller 70, and the position of the third lens frame is detected by the second lens origin sensor 22 and the lens controller 70.

When the release switch 72 is depressed by half a step, the photometering system 73 and the object distance detecting device 74 are activated to obtain object brightness data and object distance data. When the release switch 72 is depressed by a full step, the image pickup operation by the CCD 18 is carried out. Before the release switch 72 is fully depressed, the diaphragm value is set, in accordance with the object brightness data detected by the photometering system 73, by means of the diaphragm pulse motor M1, the diaphragm origin sensor 55 and the lens controller 70. Consequently, the second lens group L2 is moved to the in-focus position through the focusing motor M2 and the volume mechanism 40 in accordance with the object distance data detected by the object distance detecting device 74.

In the drive mechanism mentioned above, the positions of the second and third lens groups L2 and L3 can be independently controlled within the range of the movement of the second lens pin 16*a* of the second lens group L2 in the through hole 34*d* of the cam plate 34. Therefore, the drive apparatus of the present invention can be advantageously used particularly with a variable focus lens.

According to the present invention, the zooming operation in which the two movable lens groups are moved and the focusing operation in which one of the two movable lens groups are moved can be carried out. Moreover, the positions of the two movable lens groups can be independently controlled within a predetermined range.

What is claimed is:

1. A drive apparatus for a zoom lens barrel having at least two movable lens groups, one of which is used also as a focusing lens group, comprising:

a pair of lens frames which respectively hold the two movable lens groups;

a pair of driven pins which are integrally provided on the lens frames;

a drive cam plate which is provided with a pair of cam surfaces which engage with the corresponding driven pins, said drive cam plate being rotatable about an axis;

a rack plate which is supported to move in the optical axis direction of the movable lens groups and which is provided with an engaging portion which engages with the driven pin of the movable lens group that is used as the focusing lens group;

a first drive mechanism which includes a first motor for swinging the drive cam plate in the forward and reverse directions; and a second drive mechanism which includes a second motor for moving the rack plate without affecting the angular position of the drive cam plate.

2. A drive apparatus for zoom lens barrel according to claim 1, further comprising means for biasing said second lens group which functions as a focusing lens group in a predetermined direction, wherein said rack plate moves in association with said drive cam plate which is driven by said first drive mechanism through said driven pin for said focusing lens group.

3. A drive apparatus for a zoom lens barrel according to claim 1, wherein the driven pins extend in parallel from the lens frames in the same direction and wherein said rack plate and said drive cam plate partly overlap in a plan view.

4. A drive apparatus for a zoom lens barrel according to claim 1, wherein the rack plate, the drive cam plate, the first drive mechanism including the first motor, the second drive mechanism including the second motor are provided in a lens drive unit separate from a lens barrel body which holds therein the movable lens groups, and wherein said lens drive unit is secured to the lens barrel body in a state that the driven pins projecting from the lens barrel body engage with the cam surfaces of the drive cam plate and the engaging portion of the rack plate.

5. A drive apparatus for a zoom lens barrel having at least two movable lens groups, one of which is used also as a focusing lens group, comprising:

a drive cam plate which is provided with a pair of cam surfaces which controls the positions of the two movable lens group, said drive cam plate being rotatable about an axis;

a rack plate which is supported to move in the optical axis direction to move the movable lens group, that is used as the focusing lens group, together with the rack plate;

a first drive mechanism which includes a first motor for swinging the drive cam plate in the forward and reverse directions; and a second drive mechanism which includes a second motor for moving the rack plate without affecting the angular position of the drive cam plate.

* * * * *

UNITED STATES PATENT AND TRADEMARK OFFICE
CERTIFICATE OF CORRECTION

PATENT NO. : 5,909,320
DATED : June 1, 1999
INVENTOR(S) : M. OONO et al.

It is certified that error appears in the above-identified patent and that said Letters Patent is hereby corrected as shown below:

On the printed patent cover, at paragraph [75], line 1 (column 1, line 5), Inventors, "Saitamaken" should be ---Saitama-ken---.

On the printed patent cover, at paragraph [75], line 2 (column 1, line 6), Inventors, "Iwande" should be ---Iwanade---.

On the printed patent cover, at paragraph [57], line 6 (column 2, line 15), Abstract, after "lens" insert ---frames,---.

At column 8, line 26 (claim 5, line 6) of the printed patent, "group" should be ---groups---.

Signed and Sealed this

Eleventh Day of April, 2000

*Attest:*

Q. TODD DICKINSON

*Attesting Officer*  *Director of Patents and Trademarks*